US012300926B2

(12) United States Patent
Haberek

(10) Patent No.: US 12,300,926 B2
(45) Date of Patent: May 13, 2025

(54) NUT SEAL CONNECTOR ASSEMBLY

(71) Applicant: PPC BROADBAND, INC., East Syracuse, NY (US)

(72) Inventor: Andrew Haberek, Baldwinsville, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 103 days.

(21) Appl. No.: 18/230,339

(22) Filed: Aug. 4, 2023

(65) Prior Publication Data

US 2023/0378685 A1 Nov. 23, 2023

Related U.S. Application Data

(63) Continuation of application No. 16/909,929, filed on Jun. 23, 2020, now Pat. No. 11,749,939, which is a continuation of application No. 14/137,284, filed on Dec. 20, 2013, now Pat. No. 10,693,256.

(60) Provisional application No. 61/739,871, filed on Dec. 20, 2012.

(51) Int. Cl.

| | |
|---|---|
| ***H01R 13/52*** | (2006.01) |
| ***H01R 9/05*** | (2006.01) |
| ***H01R 43/00*** | (2006.01) |
| *H01R 103/00* | (2006.01) |

(52) U.S. Cl.

CPC ....... *H01R 13/5221* (2013.01); *H01R 9/0521* (2013.01); *H01R 43/005* (2013.01); *H01R 2103/00* (2013.01); *Y10T 29/49208* (2015.01)

(58) Field of Classification Search

None

See application file for complete search history.

(56) References Cited

U.S. PATENT DOCUMENTS

| | | | |
|---|---|---|---|
| 3,587,033 | A | 6/1971 | Brorein |
| 3,904,264 | A | 9/1975 | Oertle |
| 4,156,554 | A | 5/1979 | Aujla |
| 4,266,841 | A | 5/1981 | Sherwood |
| 4,869,679 | A | 9/1989 | Szegda |
| 5,283,853 | A | 2/1994 | Szegda |
| 6,153,830 | A | 11/2000 | Montena |
| 6,302,447 | B1 | 10/2001 | Lee |
| 6,929,265 | B2 | 8/2005 | Holland et al. |
| 7,186,127 | B2 | 3/2007 | Montena |
| 7,354,309 | B2 | 4/2008 | Palinkas |
| 7,402,063 | B2 | 7/2008 | Montena |
| 8,070,504 | B2 | 12/2011 | Amidon et al. |
| 8,337,228 | B1 | 12/2012 | Montena |
| 9,048,599 | B2 | 6/2015 | Burris |
| 9,124,046 | B2 | 9/2015 | Ehret et al. |
| 9,166,348 | B2 | 10/2015 | Burris et al. |
| 9,407,016 | B2 | 8/2016 | Burris |
| 10,693,256 | B2 | 6/2020 | Haberek |

(Continued)

OTHER PUBLICATIONS

Search Report dated Apr. 24, 2014 in corresponding International Application No. PCT/US2013/077194, 3 pages.

(Continued)

*Primary Examiner* — Oscar C Jimenez

(74) *Attorney, Agent, or Firm* — MH2 TECHNOLOGY LAW GROUP LLP

(57) ABSTRACT

An assembly for a coaxial connector is described. The assembly, in one embodiment, includes a coupler, a grip ring and a seal.

25 Claims, 11 Drawing Sheets

(56) References Cited

U.S. PATENT DOCUMENTS

| | | | | | |
|---|---|---|---|---|---|
| 10,819,047 | B2 | 10/2020 | Watkins | | |
| 11,024,989 | B2 | 6/2021 | Watkins et al. | | |
| 2003/0211778 | A1 | 11/2003 | Burris et al. | | |
| 2004/0014350 | A1 | 1/2004 | McMullen et al. | | |
| 2004/0209516 | A1 | 10/2004 | Burris et al. | | |
| 2005/0170692 | A1 | 8/2005 | Montena | | |
| 2005/0176296 | A1 | 8/2005 | Montena | | |
| 2007/0066134 | A1 | 3/2007 | Burris et al. | | |
| 2007/0093128 | A1 | 4/2007 | Thomas et al. | | |
| 2009/0025977 | A1 | 1/2009 | Anderson et al. | | |
| 2009/0191752 | A1 | 7/2009 | Montena | | |
| 2010/0323541 | A1 | 12/2010 | Amidon et al. | | |
| 2012/0037416 | A1 | 2/2012 | Chiou | | |
| 2012/0315780 | A1 | 12/2012 | Montena | | |
| 2013/0154254 | A1 | 6/2013 | Jenner et al. | | |
| 2014/0011397 | A1 | 1/2014 | Sutter | | |
| 2014/0329411 | A1 * | 11/2014 | Montena | ............ | H01R 13/6616 439/620.04 |
| 2015/0263449 | A1 | 9/2015 | Watkins | | |
| 2019/0341705 | A1 * | 11/2019 | Watkins | ............. | H01R 13/6583 |
| 2021/0036459 | A1 * | 2/2021 | Daoust | ............... | H01R 13/5219 |

OTHER PUBLICATIONS

Written Opinion dated Apr. 24, 2014 in corresponding International Application No. PCT/US2013/077194, 4 pages.

International Preliminary Report on Patentability dated Jun. 23, 2015 in corresponding International Application No. PCT/US2013/077194, 5 pages.

* cited by examiner

NUT SEAL CONNECTOR ASSEMBLY

CROSS-REFERENCE TO RELATED APPLICATIONS

This application is a continuation of U.S. application Ser. No. 16/909,929 filed Jun. 23, 2020, pending, which is a continuation of U.S. application Ser. No. 14/137,284, filed Dec. 20, 2013, now U.S. Pat. No. 10,693,256, which claims the benefit of U.S. Provisional Patent Application No. 61/739,871, filed on Dec. 20, 2012. The entire contents of such applications are hereby incorporated by reference.

BACKGROUND

Connectors for coaxial cables are typically connected onto complementary interface ports to electrically integrate coaxial cables to various electronic devices. In some instances, the coaxial cable connectors are present outdoors, exposed to weather and other numerous environmental elements. Weathering and various environmental elements can work to create interference problems when metallic conductive connector components corrode, rust, deteriorate or become galvanically incompatible, thereby resulting in intermittent contact, poor electromagnetic shielding, and degradation of the signal quality.

Thus, a need exists for an apparatus and method for providing an environmental seal when mating a coaxial cable connector with an interface port.

Therefore, there is a need to overcome, or otherwise lessen the effects of, the disadvantages and shortcomings described above.

SUMMARY

A first general aspect relates to a nut seal assembly comprising a seal member having a cooperative structure, a grip ring having a cooperative structure, and a coupling member, wherein the cooperative structure of the seal member and the cooperative structure of the grip ring cooperate when the seal member is pressed into the grip ring to operably join the seal member and the grip ring, wherein the operably joined seal member and grip ring are pressed onto the coupling member.

A second general aspect relates to a coaxial cable connector having a nut seal assembly.

A third general aspect relates to a method of providing a seal for a coaxial cable connector.

Another aspect of the present disclosure provides an assembly. The assembly includes a coupler, a grip ring and a seal member. The coupler includes an end and a shoulder. The end is configured to engage a coaxial interface port. The grip ring is configured to receive at least a part of the end. The part of the end extends from the shoulder. The seal member is configured to engage the grip ring and configured to create an environmental seal with the coupler when in an assembled state. The assembled state is when the grip ring and sealing member are engaged and the coupler is received by the grip ring.

In a further embodiment of the assembly above, the grip ring includes an inner surface and the seal member includes an outer surface configured to mate with a grip ring feature on the inner surface.

In another embodiment of any one of the assemblies above, the grip ring includes a chamfered edge configured to facilitate the sealing member receiving the coupler.

In a further embodiment of any one of the assemblies above, the coupler includes a shoulder configured to limit reception of the coupler by the grip ring.

Yet another aspect of the present disclosure provides an assembly. The assembly includes a coupler, a grip ring and a seal member. The coupler includes an end configured to engage a coaxial interface port. The grip ring is configured to receive at least a part of the end. The seal member is configured to engage the grip ring.

In another embodiment of the assembly above, the grip ring includes an inner surface and the seal member includes an outer surface configured to mate with a grip ring feature on the inner surface. The grip ring feature being an annular detent, a protrusion and/or a hook member. The outer surface may include a seal member feature configured to mate with the grip ring feature. The seal member feature being an annular detent, a protrusion and/or a hook member. The grip ring may include a chamfered edge configured to facilitate the sealing member receiving the coupler. The coupler may include a shoulder configured to limit reception of the coupler by the grip ring. The coupler may include a plurality of hex flats. The shoulder being located between the end and the plurality of hex flats.

In a further embodiment of any one of the assemblies above, the seal member extends along an axis. The seal member being configured to radially deform when axially compressed. The seal member may include an integral joint configured to enable radially deformation.

In another embodiment of any one of the assemblies above, the seal member is configured to engage at least one thread on the coaxial interface port.

In a further embodiment of any one of the assemblies above, a portion of the seal member is compressed between the grip ring and the coupler.

Another aspect of the present disclosure provides an assembly manufactured through a process. The process includes joining a grip ring and a seal member. The joined grip ring and seal member is axially advancing over an end of a coupler. The end being configured to engage a coaxial interface port.

In a further embodiment of the assembly manufactured above, joining the grip ring and the seal member includes bringing a grip ring feature into mating contact with a seal member feature of the seal member.

In another embodiment of any one of the assemblies manufactured above, the coupler includes a shoulder configured to limit reception of the coupler by the grip ring. Axially advancing the joined grip ring and seal member over the end includes advancing the joined grip ring and seal member into contact with the shoulder. The coupler may includes a plurality of hex flats, where the shoulder is located between the end and the plurality of hex flats.

Additional features and advantages of the present disclosure are described in, and will be apparent from, the following Brief Description of the Drawings and Detailed Description.

DETAILED DESCRIPTION OF EMBODIMENTS

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1A:
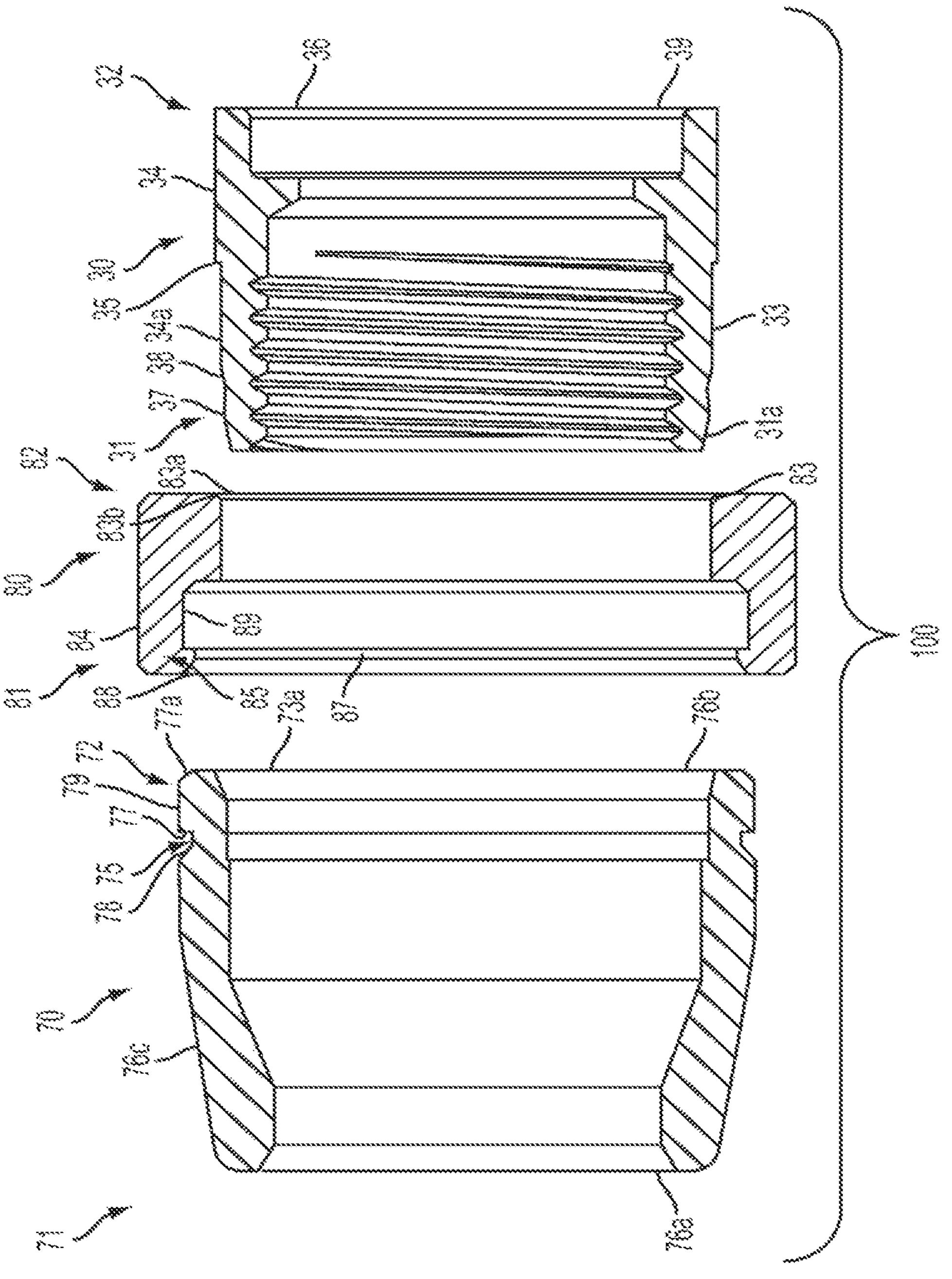
FIG. 1A depicts a cross-sectional assembly view of an embodiment of a nut seal assembly.
Figure 1B:
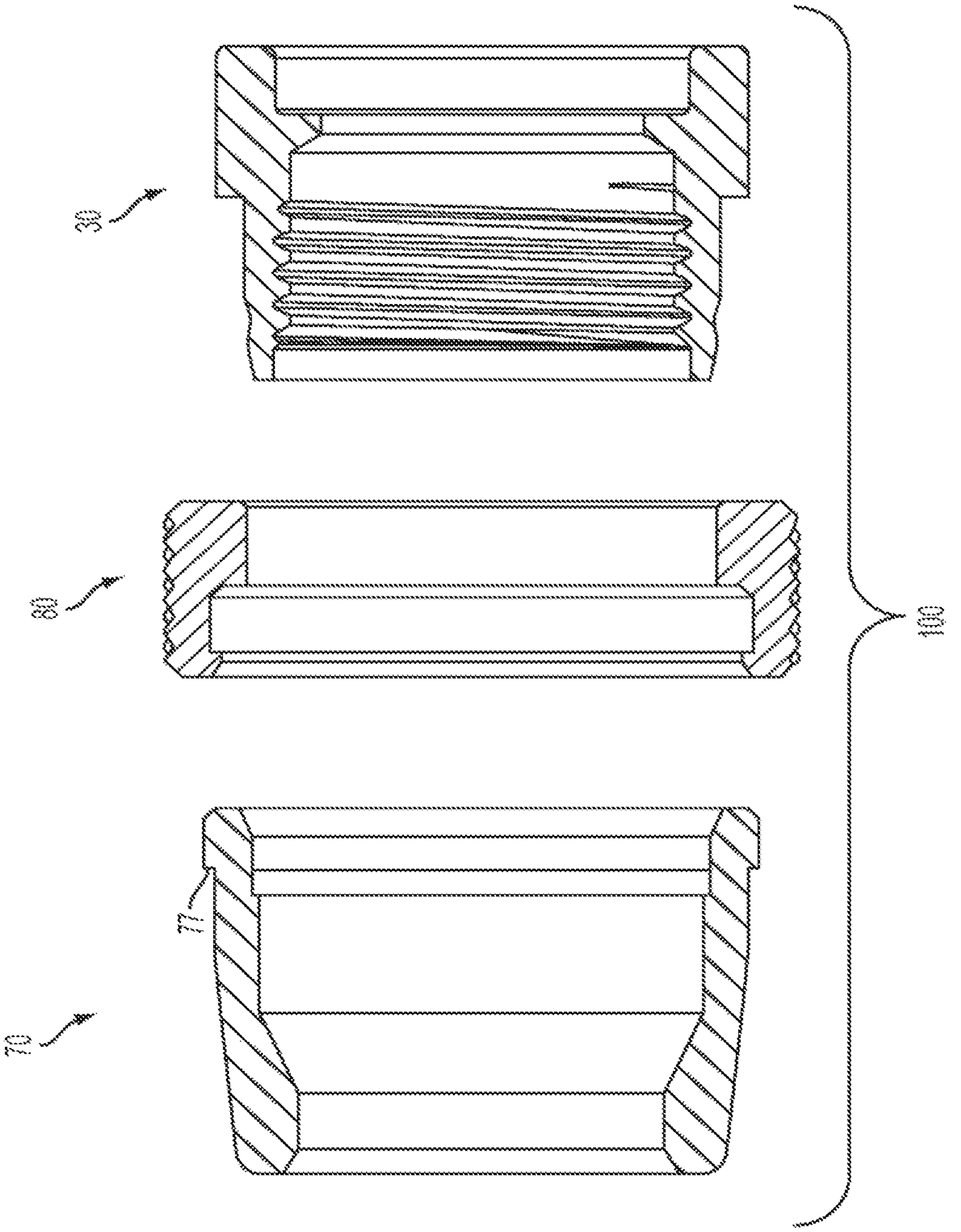
FIG. 1B depicts a cross-sectional assembly view of an alternative embodiment of a nut seal assembly.
Figure 7:
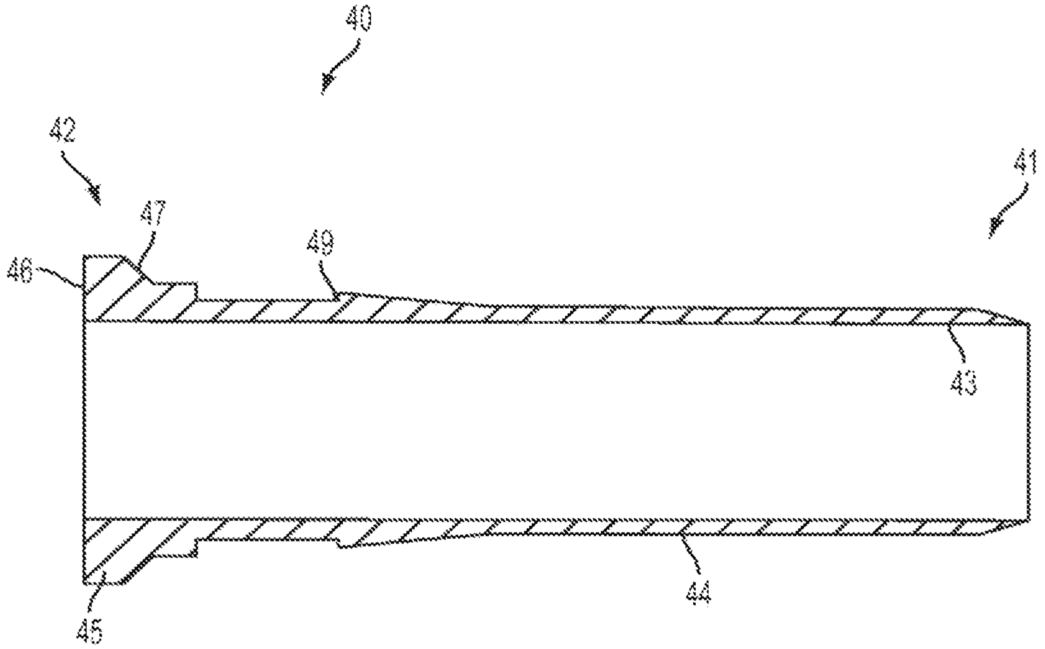
FIG. 7 depicts a cross-sectional view of an embodiment of a connector component, such as a post.

Referring to the drawings, FIGS. 1A and 1B depict an embodiment of a nut seal assembly 100. Embodiments of the nut seal assembly 100 may comprise a portion of a coaxial cable connector. A coaxial cable connector embodiment may include the nut seal assembly 100 and can be provided to a user in a preassembled configuration to ease handling and installation during use. Coaxial cable connector having nut seal assembly 100 may be an F connector, a feed-through type connector, or similar coaxial cable connector. Furthermore, the connector may include a post 40 (as shown in FIG. 7) configured for receiving a prepared portion of a coaxial cable 10.

Figure 2:
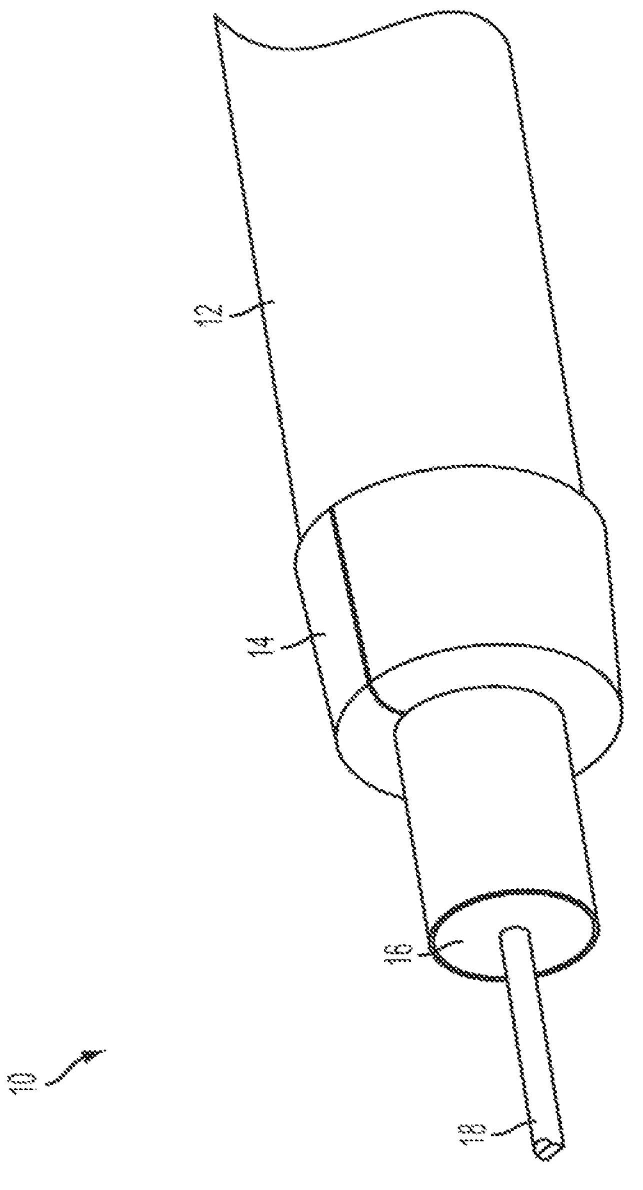
FIG. 2 depicts a perspective view of an embodiment of a coaxial cable.

Referring now to FIG. 2, a coaxial cable connector having nut seal assembly 100 may be operably affixed to a prepared end of a coaxial cable 10 so that the cable 10 is securely attached to the connector. The coaxial cable 10 may include a center conductive strand 18, surrounded by an interior dielectric 16; the interior dielectric 16 may possibly be surrounded by a conductive foil layer; the interior dielectric 16 (and the possible conductive foil layer) is surrounded by a conductive strand layer 14; the conductive strand layer 14 is surrounded by a protective outer jacket 12, wherein the protective outer jacket 12 has dielectric properties and serves as an insulator.

The conductive strand layer 14 may extend a grounding path providing an electromagnetic shield about the center conductive strand 18 of the coaxial cable 10. The coaxial cable 10 may be prepared by removing the protective outer jacket 12 and drawing back the conductive strand layer 14 to expose a portion of the interior dielectric 16 (and possibly the conductive foil layer that may tightly surround the interior dielectric 16) and center conductive strand 18. The protective outer jacket 12 can physically protect the various components of the coaxial cable 10 from damage which may result from exposure to dirt or moisture, and from corrosion. Moreover, the protective outer jacket 12 may serve in some measure to secure the various components of the coaxial cable 10 in a contained cable design that protects the cable 10 from damage related to movement during cable installation.

The conductive strand layer 14 can be comprised of conductive materials suitable for carrying electromagnetic signals and/or providing an electrical ground connection or electrical path connection. The conductive strand layer 14 may also be a conductive layer, braided layer, and the like. Various embodiments of the conductive strand layer 14 may be employed to screen unwanted noise. Those in the art will appreciate that various layer combinations may be implemented in order for the conductive strand layer 14 to effectuate an electromagnetic buffer helping to prevent ingress of environmental noise or unwanted noise that may disrupt broadband communications. In some embodiments, there may be flooding compounds protecting the conductive strand layer 14.

The dielectric 16 may be comprised of materials suitable for electrical insulation. The protective outer jacket 12 may also be comprised of materials suitable for electrical insulation.

It should be noted that the various materials of which all the various components of the coaxial cable 10 should have some degree of elasticity allowing the cable 10 to flex or bend in accordance with traditional broadband communications standards, installation methods and/or equipment. It should further be recognized that the radial thickness of the coaxial cable 10, protective outer jacket 12, conductive strand layer 14, possible conductive foil layer, interior dielectric 16 and/or center conductive strand 18 may vary based upon generally recognized parameters corresponding to broadband communication standards and/or equipment.

Referring back to FIGS. 1A and 1B, a connector, including the nut seal assembly 100, may mate with a coaxial cable interface port. The coaxial cable interface port includes a conductive receptacle for receiving a portion of a coaxial cable center conductor 18 sufficient to make adequate electrical contact. The coaxial cable interface port may further comprise a threaded exterior surface. However, various embodiments may employ a smooth surface, as opposed to threaded exterior surface. In addition, the coaxial cable interface port may comprise a mating edge. It should be recognized that the radial thickness and/or the length of the coaxial cable interface port and/or the conductive receptacle may vary based upon generally recognized parameters corresponding to broadband communication standards and/or equipment. Moreover, the pitch and depth of threads which may be formed upon the threaded exterior surface of the coaxial cable interface port may also vary based upon generally recognized parameters corresponding to broadband communication standards and/or equipment.

Furthermore, it should be noted that the interface port may be formed of a single conductive material, multiple conductive materials, or may be configured with both conductive and non-conductive materials corresponding to the port's electrical interface with a coaxial cable connector, such as a connector having nut seal assembly 100. For example, the threaded exterior surface may be fabricated from a conductive material, while the material comprising the mating edge may be non-conductive or vice versa. However, the conductive receptacle should be formed of a conductive material. Further still, it will be understood by those of ordinary skill that the interface port may be embodied by a connective interface component of a communications modifying device such as a signal splitter, a cable line extender, a cable network module and/or the like.

Referring further to FIGS. 1A and 1B, embodiments of the nut seal assembly 100 may include a grip ring 80, a seal member 70, and a coupling member 30.

Embodiments of the nut seal assembly 100 may include a grip ring 80. Embodiments of a grip ring 80 may include a first end 81, a second end 82, an inner surface 83, an outer surface 84, and a generally axial opening therethrough. Embodiments of the outer surface 84 of the grip ring 80 may include surface features, such as knurling or hex flats, to enhance a gripping of the grip ring 80 by an installer and/or user. Embodiments of the grip ring 80 may include a cooperative structure 85 proximate or at the first end 81 of the grip ring 80 for cooperative engagement with a cooperative structure 75 of a sealing member 70. Embodiments of the cooperative structure 85 may be an annular protrusion, extension, hook member, or similar structure that can extend radially inward a distance from the inner surface 83 of the grip ring 80.

The cooperative structure 85 may be defined by a ramped surface 88 and a vertical engagement surface 87, wherein the ramped surface 88 may be separated from the vertical engagement surface 87 by a flat or relatively flat section of the grip ring 80 within the cooperative structure 85. Those skilled in the art should appreciate that the cooperative structure 85 may include various designs, wherein two ramped surfaces are incorporated to define the cooperative structure 85. Similarly, embodiments of the cooperative structure 85 may include two vertical faces and no ramped surface to define the cooperative structure 85. Embodiments of the cooperative structure 85 may be sized and dimensioned for cooperative engagement with the cooperative structure 75 of the sealing member 70 to facilitate operable connection/attachment between the sealing member 70 and the grip ring 80.

Moreover, embodiments of the grip ring 80 may include an annular detent section 89 for engagement with an annular section 79 of the seal member 70 when in an assembled position. Embodiments of the annular detent section 89 may located between the cooperative structure 85 and the coupling member engagement section 83*a*. For instance, the annular detent section 89 may be defined by the vertical engagement surface 87 and an edge of the coupling member engagement section 83*a*.

In other words, embodiments of the annular section 79 of the sealing member 70 may fit within the annular detent section 89 of the grip ring 80 to enhance an operable connection/attachment between the grip ring 80 and the sealing member 70.

Furthermore, embodiments of the coupling member engagement section 83*a* may be configured to press-fit engage an outer surface portion 34*a* of the coupling member 30, when in the assembled position. Further, embodiments of the grip ring 80 may be formed of conductive or non-conductive material. In addition, embodiments of the grip ring 80 may be formed of metals or polymers or other materials that would facilitate a rigidly formed body. Manufacture of the grip ring 80 may include casting, extruding, cutting, turning, tapping, drilling, injection molding, blow molding, or other fabrication methods that may provide efficient production of the component.

Embodiments of the nut seal assembly 100 may include a seal member 70. Embodiments of the seal member 70 may include a first end 71, a second end 72, an inner surface 73, an outer surface 74, and a generally axial opening therethrough. Embodiments of seal member 70 may have a generally tubular body that is elastically deformable by nature of its material characteristics and design. In most embodiments, the seal member 70 is a one-piece element made of a compression molded, elastomer material having suitable chemical resistance and material stability (i.e., elasticity) over a temperature range between about −40.degree. C. to +40.degree. C. For example, the sealing member 70 may be made of silicone rubber. Alternatively, the material may be propylene, a typical O-ring material. Other materials known in the art may also be suitable.

Furthermore, the first end 71 of seal member 70 may be a free end for ultimate engagement with a port, while the second end 72 may be for ultimate connection to the grip ring 80. The seal 70 may have a forward sealing portion 76*a*, a rear sealing portion 76*b* including an interior sealing surface 73*a* that engages the forward sealing surface 37 of the coupling member 30, and an integral joint-section 76*c* intermediate the first end 71 and the second end 72 of the tubular body of the sealing member 70. Embodiments of the forward sealing portion 76*a* may be configured to engage threads of a port. The forward sealing portion 76*a* proximate the first end 71 of the sealing member 70 may also include annular facets to assist in forming a seal with a port, such as a coaxial interface port. Alternatively, forward sealing portion 76*a* may be a continuous rounded annular surface that forms effective seals through the elastic deformation of the inner surface 73 and end of the sealing member 70 compressed against the port.

Embodiments of the integral joint-section 76*c* may include a portion of the length of the sealing member 70 which can be relatively thinner in radial cross-section to encourage an outward expansion or bowing of the seal 70 upon its axial compression. Accordingly, compressive axial force may be applied against one or both ends of the seal depending upon the length of the port intended to be sealed. The force can act to axially compress the seal whereupon it can expand radially in the vicinity of the integral joint-section 76*c*. In one embodiment, the integral joint-section 76*c* is located axially asymmetrically intermediate the first end 71 and the second end 72 of the tubular body of the seal member 70, and adjacent an anterior end of the interior sealing surface 73*a*. Embodiments of the sealing member 70 may have an interior diameter at the integral joint-section 76*c* equal to about 0.44 inches in an uncompressed state; the tubular body of the sealing member 70 may have a length from the first end 71 to the second end 72 of about 0.36 inches in an uncompressed state. However, it is contemplated that the joint-section 76*c* can be designed to be inserted anywhere between the sealing surface and the first end 71. The sealing member 70 may prevent the ingress of water, moisture, and corrosive elements when the seal is used for its intended function.

Moreover, embodiments of the sealing member 70 may include a cooperative structure 75 proximate or at the second end 72 of the sealing member 70 for cooperative engagement with the cooperative structure 85 of the grip ring 80. Embodiments of the cooperative structure 75 may be an annular groove, channel, detent, and the like. The cooperative structure 75 may be defined by a ramped surface 78 and a vertical engagement surface 77, wherein the ramped surface 78 may be separated from the vertical engagement surface 77 by a flat or relatively flat section of the seal member 70 within the cooperative structure. Those skilled in the art should appreciate that the cooperative structure 75 may include various designs, wherein two ramped surfaces are incorporated to define the cooperative structure 75. Similarly, embodiments of the cooperative structure 75 may include two vertical faces and no ramped surface to define the cooperative structure 75. Embodiments of the cooperative structure 75 may be sized and dimensioned for cooperative engagement with the cooperative structure 85 of the grip ring 80 to facilitate operable connection/attachment between the sealing member 70 and the grip ring 80.

In alternative embodiment shown in FIG. 1B, embodiments of the cooperative structure 75 may simply be a stepped portion of the seal member 70. For instance, vertical engagement surface 77 may define a stepped reduction in an outer diameter of the seal member 70 proximate or otherwise near the second end 72. Cooperative structure 85 of the grip ring 80 may engage, cooperate, interact, etc. with the cooperative structure 75 of the alternative embodiment to retain engagement between the components, wherein the cooperative structure 75 does not include a ramped surface 78 and/or does not form an annular groove in the seal member 70.

Referring still to FIGS. 1A and 1B, embodiments of the nut seal assembly 100 may include a port coupling member 30 (for example, a nut). The coupling member 30 may be a nut, a threaded nut, port coupling element, rotatable port coupling element, and the like. The coupling member 30 may include a first end 31, second end 32, an inner surface 33, an outer surface 34, and a generally axial opening therethrough. The inner surface 33 of the coupling member 30 may be a threaded configuration, the threads having a pitch and depth corresponding to a threaded port, such as a coaxial interface port. In other embodiments, the inner surface 33 of the coupling element 30 may not include threads, and may be axially inserted over an interface port.

The coupling element 30 may be rotatably secured to the post 40 (shown in FIG. 7) to allow for rotational movement about the post 40. The coupling member 30 may comprise an internal lip 36 located proximate the second end 32 and configured to hinder axial movement of the post 40. Furthermore, the coupling member 30 may comprise a cavity 39 extending axially from the edge of second end 32 and partial defined and bounded by the internal lip 36. The cavity 39 may also be partially defined and bounded by an outer internal wall.

Furthermore, embodiments of the coupling member 309 may include a forward sealing surface 37 that can engage an interior sealing surface 73*a* of the sealing member 70, and an outer surface portion 34*a* that can engage a coupling member engagement portion 83*a* of the grip ring 80. The forward sealing surface 37 and the outer surface portion 34*a* may be separated by a ramped portion 38 that may correspond to a ramped end portion of the sealing member 70.

Moreover, the coupling member 30 may be formed of conductive materials facilitating grounding through the coupling member 30, or threaded nut. Accordingly, the coupling member 30 may be configured to extend an electromagnetic buffer by electrically contacting conductive surfaces of an interface port when a coaxial cable connector, is advanced onto the port. In addition, the coupling member 30 may be formed of non-conductive material and function only to physically secure and advance a connector onto an interface port. Moreover, the coupling member 30 may be formed of both conductive and non-conductive materials. In addition, the coupling element 30 may be formed of metals or polymers or other materials that would facilitate a rigidly formed body. Manufacture of the coupling member 30 may include casting, extruding, cutting, turning, tapping, drilling, injection molding, blow molding, or other fabrication methods that may provide efficient production of the component.

Figure 3A:
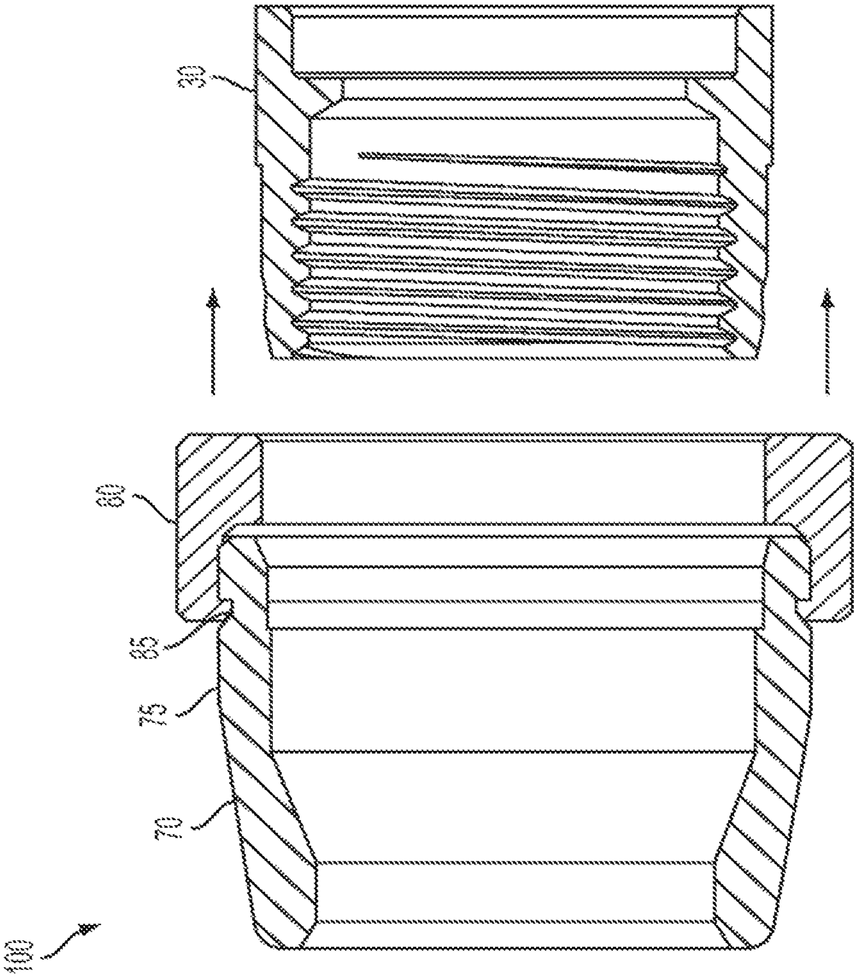
FIG. 3A depicts a cross-sectional view of an embodiment of a seal member joined with a grip ring before being joined with a coupling member.
Figure 3B:
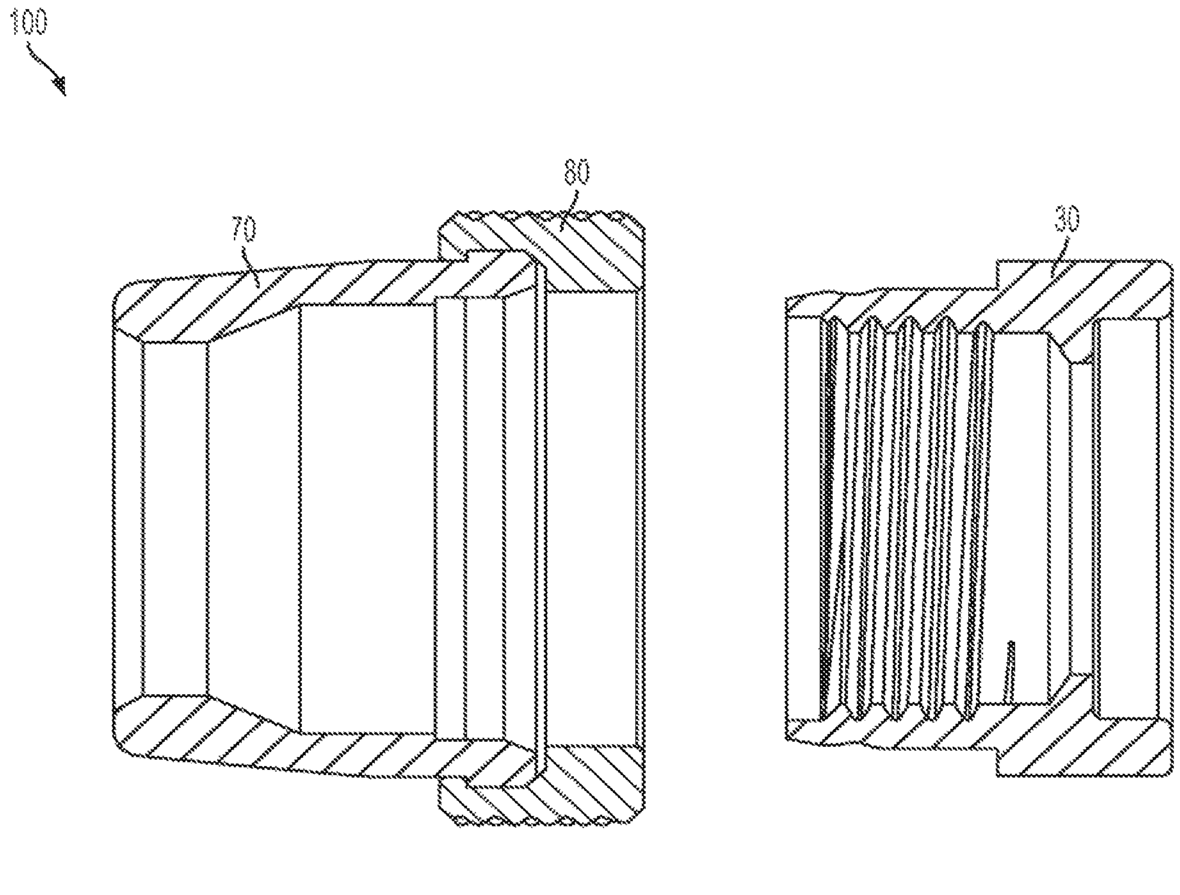
FIG. 3B depicts a cross-sectional view of an alternative embodiment of a seal member joined with a grip ring before being joined with a coupling member.
Figure 4A:
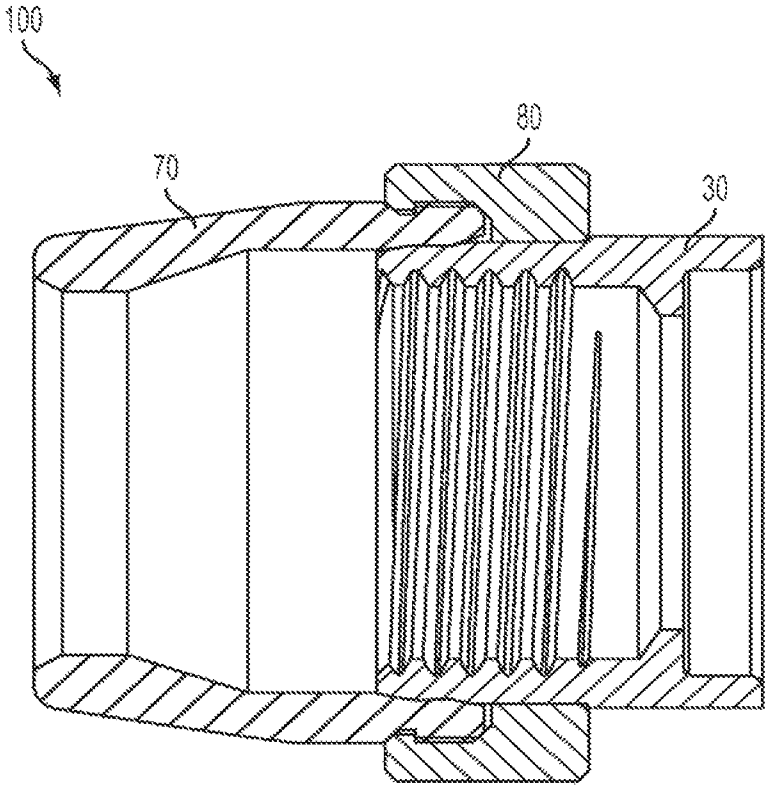
FIG. 4A depicts a cross-sectional view of an embodiment of the nut seal assembly in an assembled position.
Figure 4B:
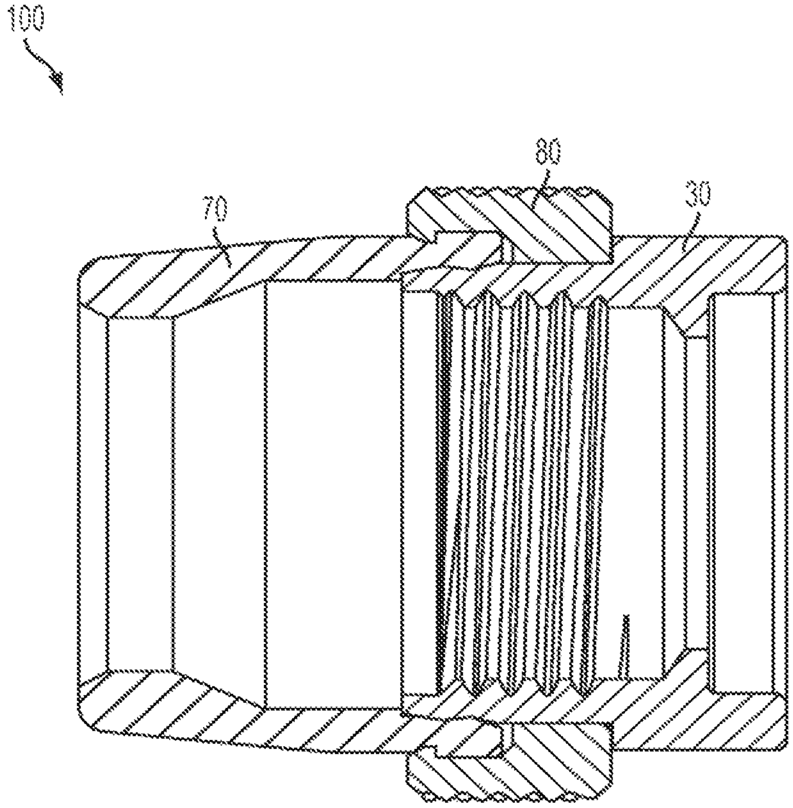
FIG. 4B depicts a cross-sectional view of an alternative embodiment of the nut seal assembly in an assembled position.
Figure 5:
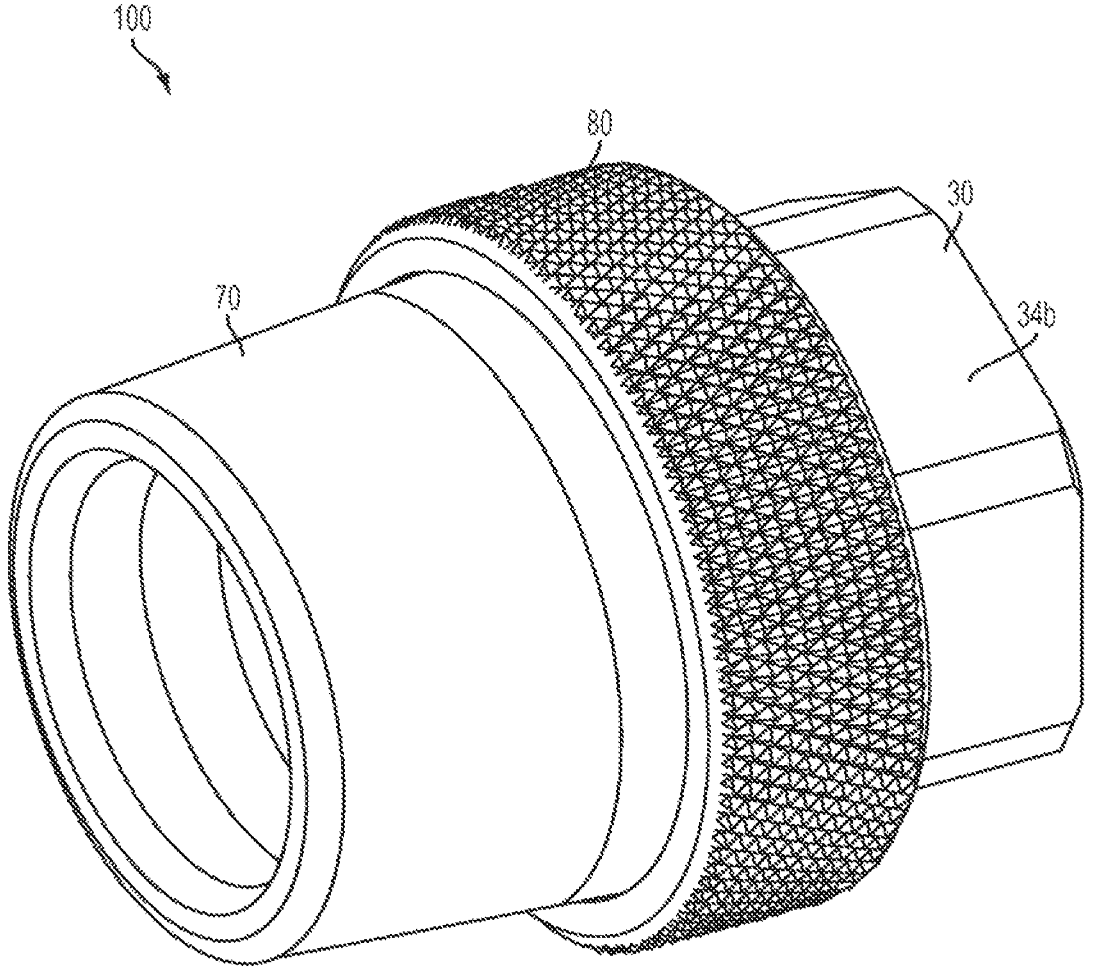
FIG. 5 depicts a perspective view of an embodiment of the nut seal assembly in the assembled position.
Figure 6:
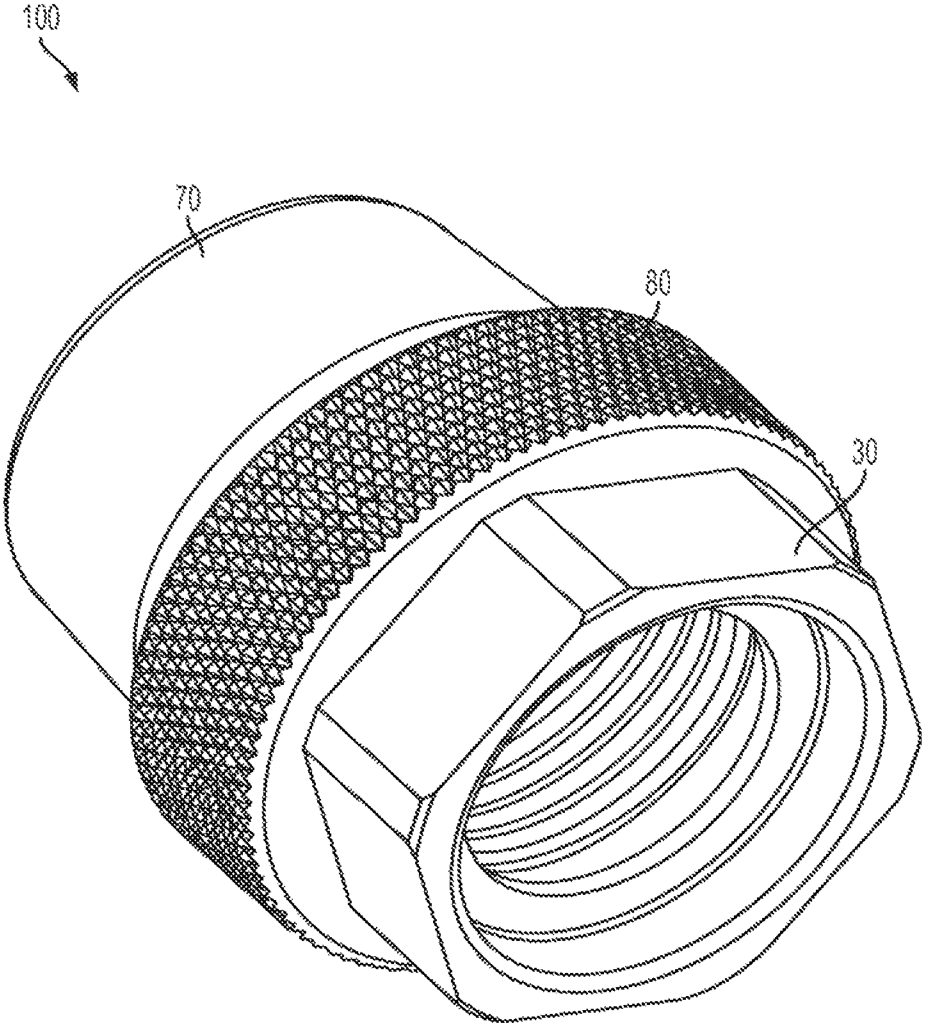
FIG. 6 depicts a rear perspective view of an embodiment of the nut seal assembly in the assembled position.

With continued reference to FIGS. 1A and 1B, and now with additional reference to FIGS. 3-5, the manner in which embodiments of nut seal assembly 100 are assembled together in an assembled position will now be described. First, as shown in FIGS. 3A and 3B, embodiments of the seal member 70 can be pressed into the grip ring 80. Embodiments of the ramped surface portion 88 of the cooperative structure 85 of the grip ring 80 may allow or facilitate an axial entry of the sealing member 70 into the first end 81 of the grip ring 80 through structural cooperation with a chamfered or ramped edge 79*a* of the annular section 79 of the sealing member 70. Once the chamfered edge 79*a* of the seal member 70 is axially beyond the cooperative structure 85, the seal member 70 can be further axially pressed into the grip ring 80 until a structural mating of the cooperative structure 85 of the grip ring 80 and the cooperative structure 75 of the seal member 70 occurs. For instance, the structural protrusion of the cooperative structure 85 of the grip ring 80 may cooperate with and physically fit within the groove-like cooperative structure 75 of the seal member 70. Those having skill in the art should appreciate that an alternative embodiment exists where the cooperative structure 75 of the seal member 70 includes a structural protrusion while the cooperative structure 85 of the grip ring 80 includes a groove like structure. In this position, the annular section 79 of the sealing member 70 may be received by the annular detent portion 89 of the grip ring 80. Moreover, when the cooperative structures 75, 85 are cooperatively engaged, the vertical engagement surfaces 77, 87 of the seal member 70 and the grip ring 80, respectively, can help prevent or hinder axial displacement of the seal member 70 from the grip ring 80.

FIGS. 4A-6 depict an embodiment of the assembled position of the nut seal assembly 100. Once the seal member 70 is pressed into the grip ring 80, the grip ring 80 may be pressed onto the coupling member 30. Embodiments of the grip ring 80 may include a chamfered edge 83*b* proximate or at the second end 82 of the grip ring 80 that may allow or facilitate an axial advancement of the sealing grip ring 80 onto/over the first end 31 of the coupling member 30 through structural cooperation with a chamfered edge 31*a* proximate or at the first end 31 of the coupling member 30.

The grip ring 80 may be pressed onto the coupling member 30 until the grip ring 80 reaches a ramped portion 35 of the coupling member 30. In other words, the grip ring 80 may reside in press engagement with the outer surface portion 34*a* of the coupling member 30 when in an assembled position. In an exemplary embodiment, the grip ring 80 is pressed onto the coupling member 30 a distance that leaves an outer hex shaped surface 34*b* of the coupling member 30 exposed; the grip ring 80 is not pressed over the hex on the coupler 30. The pressing of the grip ring 80 onto the coupling member 30 may physically capture the sealing member 70 so that seal member 70 cannot be removed under normal operating conditions and installation procedures.

Because the seal member 70 is first pressed into the grip ring 80 and then the grip ring 80 is pressed onto the coupling member 30 but not over the hex on the coupler 30, as opposed to pressing a seal member onto the nut and then pressing a grip ring over the hex on the nut where it engage in a press fit, a thickness of the grip ring 80 may be increased to increase the structural strength of the component to avoid cracking over time due to the stress from the press fit. Furthermore, embodiments of the coupling member 30 may be manufactured from hex bar stock, as opposed to being manufactured from round bar stock, wherein the hex shape has to be machined into the nut.

Figure 9:
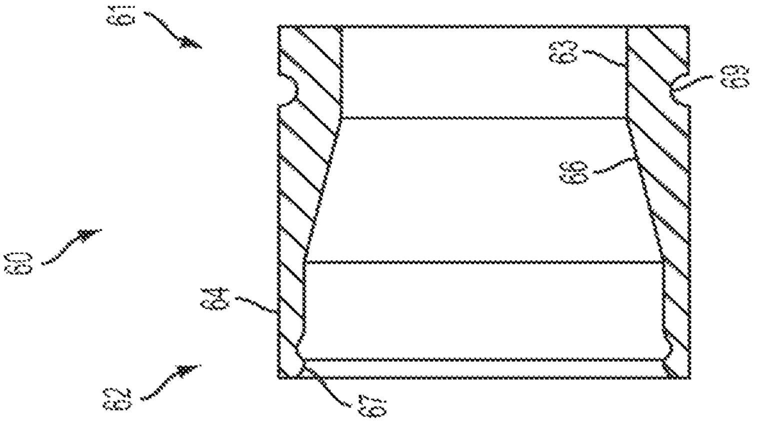
FIG. 9 depicts a cross-sectional view of an embodiment of a connector component, such as a fastener member.
Figure 8:
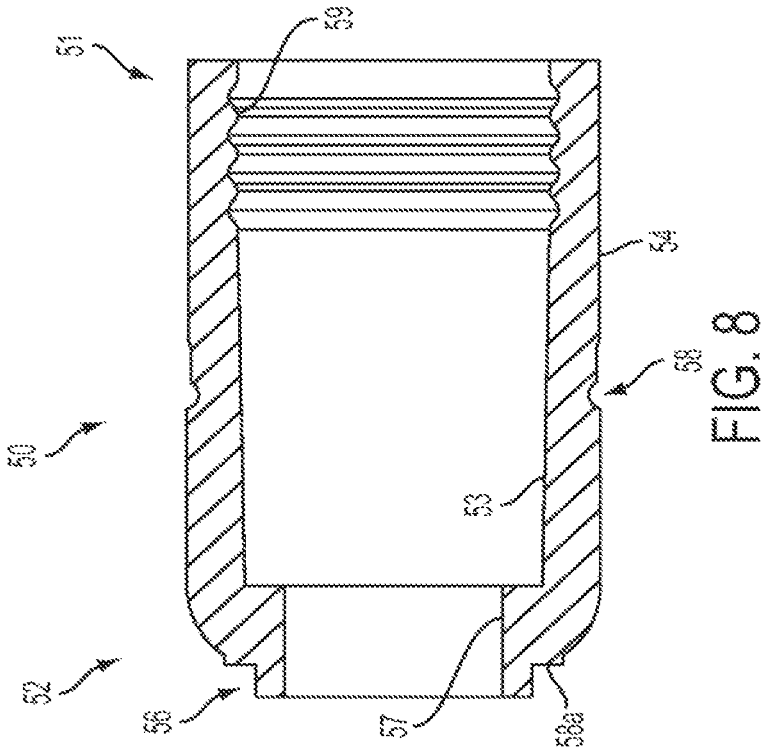
FIG. 8 depicts a cross-sectional view of an embodiment of a connector component, such as a connector body.

With continued reference to the drawings, FIGS. 7-9 depict an embodiment of components of a coaxial cable connector. Embodiments of a connector may having a nut seal assembly 100 may also include a post 40, a connector body 50, and a fastener member 60.

Embodiments of connector may include a post 40. The post 40 comprises a first end 41, a second end 42, an inner surface 43, and an outer surface 44. Furthermore, the post 40 may include a flange 45, such as an externally extending annular protrusion, located proximate or otherwise near the second end 42 of the post 40. The flange 45 may include an outer tapered surface 47 facing the first end 41 of the post 40 (e.g., tapers inward toward the first end 41 from a larger outer diameter proximate or otherwise near the second end 42 to a smaller outer diameter). The outer tapered surface 47 of the flange 45 may correspond to a tapered surface of the lip 37 of the coupling member 30. Further still, an embodiment of the post 40 may include a surface feature 49 such as a lip or protrusion that may engage a portion of a connector body 50 to secure axial movement of the post 40 relative to the connector body 50. However, the post 40 may not include such a surface feature 49, and the coaxial cable connector may rely on press-fitting and friction-fitting forces and/or other component structures to help retain the post 40 in secure location both axially and rotationally relative to the connector body 50. The location proximate or otherwise near where the connector body 50 is secured relative to the post 40 may include surface features, such as ridges, grooves, protrusions, or knurling, which may enhance the secure location of the post 40 with respect to the connector body 50.

Additionally, the post 40 includes a mating edge 46, which may be configured to make physical and electrical contact with a corresponding mating edge 26 of an interface port. The post 40 should be formed such that portions of a prepared coaxial cable 10 including the dielectric 16 and center conductor 18 can pass axially into the first end 41 and/or through a portion of the tube-like body of the post 40. Moreover, the post 40 can be dimensioned such that the post 40 may be inserted into an end of the prepared coaxial cable 10, around the dielectric 16 and under the protective outer jacket 12 and conductive grounding shield or strand 14. Accordingly, where an embodiment of the post 40 may be inserted into an end of the prepared coaxial cable 10 under the drawn back conductive strand 14, substantial physical and/or electrical contact with the strand layer 14 may be accomplished thereby facilitating grounding through the post 40.

The post 40 may be formed of metals or other conductive materials that would facilitate a rigidly formed post body. In addition, the post 40 may be formed of a combination of both conductive and non-conductive materials. For example, a metal coating or layer may be applied to a polymer of other non-conductive material. Manufacture of the post 40 may include casting, extruding, cutting, turning, drilling, knurling, injection molding, spraying, blow molding, component overmolding, or other fabrication methods that may provide efficient production of the component.

Referring to FIG. 8, embodiments of a coaxial cable connector may include a connector body 50. The connector body 50 may include a first end 51, a second end 52, an inner surface 53, and an outer surface 54. Moreover, the connector body 50 may include a post mounting portion 57 proximate or otherwise near the second end 52 of the body 50; the post mounting portion 57 configured to securely locate the body 50 relative to a portion of the outer surface 44 of post 40, so that the connector body 50 is axially secured with respect to the post 40, in a manner that can prevent the two components from moving with respect to each other in a direction parallel to the axis of the connector. In addition, the connector body 50 may include a shoulder **58*a* defining an outer annular recess 56 located proximate or near the second end 52 of the connector body 50**.

Furthermore, the connector body 50 may include a semi-rigid, yet compliant outer surface 54, wherein the outer surface 54 may be configured to form an annular seal when the first end 51 is deformably compressed against a received coaxial cable 10 by operation of a fastener member 60 (shown in FIG. 9). The connector body 50 may include an external annular detent 58 located along the outer surface 54 of the connector body 50. Further still, the connector body 50 may include internal surface features 59, such as annular serrations formed near or proximate the internal surface of the first end 51 of the connector body 50 and configured to enhance frictional restraint and gripping of an inserted and received coaxial cable 10, through tooth-like interaction with the cable 10.

The connector body 50 may be formed of materials such as plastics, polymers, bendable metals or composite materials that facilitate a semi-rigid, yet compliant outer surface 54. Further, the connector body 50 may be formed of conductive or non-conductive materials or a combination thereof. Manufacture of the connector body 50 may include casting, extruding, cutting, turning, drilling, knurling, injection molding, spraying, blow molding, component overmolding, combinations thereof, or other fabrication methods that may provide efficient production of the component.

With reference now to FIG. 9, embodiments of a coaxial cable connector having nut seal assembly 100 may also include a fastener member 60. The fastener member 60 may have a first end 61, second end 62, inner surface 63, and outer surface 64. In addition, the fastener member 60 may include an internal annular protrusion 67 located proximate the second end 62 of the fastener member 60 and configured to mate and achieve purchase with the annular detent 58 on the outer surface 54 of connector body 50.

Moreover, the fastener member 60 may comprise a central passageway or generally axial opening defined between the first end 61 and second end 62 and extending axially through the fastener member 60. The central passageway may include a ramped surface 66 which may be positioned between a first opening or inner bore having a first inner diameter positioned proximate or otherwise near the first end 61 of the fastener member 60 and a second opening or inner bore having a larger, second inner diameter positioned proximate or otherwise near the second end 62 of the fastener member 60. The ramped surface 66 may act to deformably compress the outer surface 54 of the connector body 50 when the fastener member 60 is operated to secure a coaxial cable 10. For example, the narrowing geometry will compress squeeze the first end 51 of the connector body 50 against the cable 10, when the fastener member 60 is compressed into a tight and secured position on the connector body 50.

Additionally, the fastener member 60 may comprise an exterior surface feature 69 positioned proximate with or close to the first end 61 of the fastener member 60. The surface feature 69 may facilitate gripping of the fastener member 60 during operation of the connector. Although the surface feature 69 is shown as an annular detent, it may have various shapes and sizes such as a ridge, notch, protrusion, knurling, or other friction or gripping type arrangements. The first end 61 of the fastener member 60 may extend an axial distance so that, when the fastener member 60 is compressed into sealing position on the coaxial cable 10, the fastener member 60 touches or resides substantially proximate significantly close to the coupling member 30.

It should be recognized, by those skilled in the requisite art, that the fastener member 60 may be formed of rigid materials such as metals, hard plastics, polymers, composites and the like, and/or combinations thereof. Furthermore, the fastener member 60 may be manufactured via casting, extruding, cutting, turning, drilling, knurling, injection molding, spraying, blow molding, component overmolding, combinations thereof, or other fabrication methods that may provide efficient production of the component.

A connector having a nut seal assembly 100 may incorporate a different component or technique to form a seal against the cable 10. For instance, the connector may include a fastener member that is disposed within opening of the connector body 50 to form a seal against the cable 10. Moreover, the connector may include a connector body 50 having a frangible portion configured to break apart from the connector body 50 and compress against the cable 10. Other embodiments of the connector may have a crimped end to form a seal against the cable.

Referring to FIGS. 1-9, a method of providing a seal member onto a coaxial cable connector may include the steps of providing a seal member 70, a grip ring 80, and a coupling member 30, pressing, or operably joining, the seal member 70 into the grip ring 80, and then pressing, or operably joining, the grip ring 80 with the seal member 70 attached onto the coupling member 30 to achieve an assembled position.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An assembly comprising:

a coupler portion comprising a forward portion, a rearward portion, and a coupler outer surface portion having a radially-extending coupler shoulder portion, the forward portion being structurally configured to engage a coaxial interface port;

a seal portion retaining portion having a rearward end portion with a seal portion retaining portion surface, the seal portion retaining portion being structurally configured to receive the forward portion of the coupler portion;

a seal portion structurally configured to engage the seal portion retaining portion;

wherein the seal portion retaining portion and the coupler portion are structurally configured to physically capture the seal portion therebetween;

wherein the seal portion has a seal portion coupler sealing surface portion structurally configured to contact a coupler portion sealing surface portion of the coupler portion to create an environmental seal between the seal portion and the coupler portion;

wherein the seal portion is structurally configured to form an environmental seal between the coupler portion and the coaxial interface port;

wherein the radially-extending coupler shoulder portion and the seal portion retaining portion surface are structurally configured to cooperate to limit axial movement of the coupler portion relative to the seal portion retaining portion;

wherein the seal portion includes a seal portion cooperative structure that is structurally configured to engage a seal portion retaining portion cooperative structure to couple the seal portion retaining portion with the seal portion; and wherein the coupled seal portion retaining portion and the seal portion are structurally configured to be press fit together onto the forward portion of the coupler portion so as to form a combination that is structurally configured to be pushed into place as a single unit that remains securely mounted to the coupler portion.

2. The assembly of claim 1, wherein the seal portion retaining portion comprises an inner portion having a seal portion retaining portion annular portion rearward of the seal portion retaining portion cooperative structure, the seal portion retaining portion annular portion being structurally configured to receive a seal portion annular portion of the seal portion, a rearward end of the seal portion retaining portion annular portion comprising a radially-extending, forward-facing portion, the forward-facing portion and the seal portion retaining portion cooperative structure being structurally configured to retain the seal portion annular portion in the seal portion retaining portion annular portion and/or hinder axial displacement of the seal portion relative to the seal portion retaining portion.

3. The assembly of claim 1, wherein the seal portion retaining portion is a grip ring portion.

4. The assembly of claim 3, wherein the grip ring portion is a grip ring.

5. The assembly of claim 1, wherein the radially-extending coupler shoulder portion is configured to be between the forward portion and the rearward portion.

6. The assembly of claim 1, wherein the forward portion of the coupler portion extends forwardly from the radially-extending coupler portion shoulder portion.

7. The assembly of claim 1, wherein the seal portion cooperative structure is configured to cooperatively engage the seal portion retaining portion cooperative structure at a forward end of the seal portion retaining portion.

8. The assembly of claim 1, wherein the inner portion is an inner wall portion.

9. The assembly of claim 1, wherein the radially-extending, forward-facing portion is a wall portion.

10. The assembly of claim 1, wherein the seal portion retaining portion annular portion is an annular detent portion.

11. An assembly comprising:

a coupler portion structurally configured to engage a coaxial interface port;

a seal portion retaining portion structurally configured to receive the coupler portion;

a seal portion structurally configured to engage the seal portion retaining portion;

wherein the seal portion has a seal portion coupler sealing surface portion structurally configured to contact the coupler portion to create an environmental seal between the seal portion and the coupler portion;

wherein the seal portion includes a seal portion cooperative structure that is structurally configured to engage a seal portion retaining portion cooperative structure to couple the seal portion retaining portion with the seal portion; and wherein the coupled seal portion retaining portion and the seal portion are structurally configured to be press fit together onto the forward portion of the coupler portion so as to form a combination that structurally configured to be pushed into place as a single unit that remains securely mounted to the coupler portion.

12. The assembly of claim 11, wherein the coupler portion comprises a forward portion, a rearward portion, and a coupler outer surface portion having a radially-extending coupler shoulder portion.

13. The assembly of claim 11, wherein the seal portion retaining portion comprises a rearward end portion with a seal portion retaining portion surface, the seal portion retaining portion surface being structurally configured to receive the forward portion of the coupler portion.

14. The assembly of claim 11, wherein the seal portion retaining portion comprises an inner portion having a seal portion retaining portion annular portion rearward of the seal portion retaining portion cooperative structure, the seal portion retaining portion annular portion being structurally configured to receive a seal portion annular portion of the seal portion, a rearward end of the seal portion retaining portion annular portion comprising a radially-extending, forward-facing portion, the forward-facing portion and the seal portion retaining portion cooperative structure being structurally configured to retain the seal portion annular portion in the seal portion retaining portion annular portion and/or hinder axial displacement of the seal portion relative to the seal portion retaining portion.

15. The assembly of claim 11, wherein the seal portion retaining portion is a grip ring.

16. The assembly of claim 11, wherein the seal portion retaining portion and the coupler portion are configured to physically capture the seal portion therebetween.

17. The assembly of claim 11, wherein the seal portion coupler sealing surface portion is configured to contact a coupler portion sealing surface portion of the coupler portion to create the environmental seal between the seal portion and the coupler portion.

18. The assembly of claim 11, wherein the radially-extending coupler shoulder portion and the seal portion retaining portion surface are configured to cooperate to limit axial movement of the coupler portion relative to the seal portion retaining portion.

19. The assembly of claim 11, wherein the seal portion is configured to form an environmental seal between the coupler portion and the coaxial interface port.

20. An assembly comprising:

a coupler portion structurally configured to engage a coaxial interface port;

a seal portion retaining portion structurally configured to receive the coupler portion;

a seal portion configured to engage the seal portion retaining portion;

wherein the seal portion includes a seal portion cooperative structure structurally configured to cooperatively engage a seal portion retaining portion cooperative structure to couple the seal portion retaining portion with the seal portion; and wherein the coupled seal portion retaining portion and the seal portion are configured to be press fit together onto the coupler portion so as to form a combination that can be pushed into place as a single unit that remains securely mounted to the coupler portion.

21. The assembly of claim 20, wherein the seal portion retaining portion is a grip ring.

22. The assembly of claim 20, wherein the coupler portion comprises a forward portion, a rearward portion, and a coupler outer surface portion having a radially-extending coupler shoulder portion.

23. The assembly of claim 22, wherein the seal portion retaining portion comprises a rearward end portion with a seal portion retaining portion surface, the seal portion retaining portion being structurally configured to receive the forward portion of the coupler portion.

24. The assembly of claim 23, wherein the seal portion retaining portion comprises an inner portion having a seal portion retaining portion annular portion rearward of the seal portion retaining portion cooperative structure, the seal portion retaining portion annular portion being configured to receive a seal portion annular portion of the seal portion, a rearward end of the seal portion retaining portion annular portion comprising a radially-extending, forward-facing portion, the forward-facing portion and the seal portion retaining portion cooperative structure being structurally configured to retain the seal portion annular portion in the seal portion retaining portion annular portion and/or hinder axial displacement of the seal portion relative to the seal portion retaining portion.

25. The assembly of claim 20, wherein the seal portion has a seal portion coupler sealing surface portion configured to contact the coupler portion to create an environmental seal between the seal portion and the coupler portion.

* * * * *